United States Patent [19]

Nagashima et al.

[11] Patent Number: 4,527,172

[45] Date of Patent: Jul. 2, 1985

[54] THERMAL TRANSFER RECORDING APPARATUS

[75] Inventors: Masayoshi Nagashima, Chigasaki; Hiroshi Yamane, Ebina; Shigeru Kikkawa, Kawasaki; Yoshinori Teraki, Tokyo, all of Japan

[73] Assignee: Tokyo Shibaura Denki Kabushiki Kaisha, Kawasaki, Japan

[21] Appl. No.: 579,641

[22] Filed: Feb. 13, 1984

[30] Foreign Application Priority Data

Feb. 14, 1983 [JP] Japan .................................. 58-22405

[51] Int. Cl.3 ...................... G01D 15/10; G01D 15/00; B41J 3/20; B41J 11/58

[52] U.S. Cl. ................................ 346/76 PH; 346/145; 400/120; 400/624; 400/629

[58] Field of Search .......................... 346/76 PH, 145; 400/120, 624, 629

[56] References Cited

U.S. PATENT DOCUMENTS

| | | | |
|---|---|---|---|
| 3,051,408 | 8/1962 | Finch | 346/145 X |
| 4,053,899 | 10/1977 | Strange | 346/145 X |
| 4,053,900 | 10/1977 | Strange | 346/145 X |
| 4,444,521 | 4/1984 | Rickard et al. | 346/76 PH X |

*Primary Examiner*—George H. Miller, Jr.

*Attorney, Agent, or Firm*—Cushman, Darby & Cushman

[57] ABSTRACT

A thermal transfer recording apparatus according to the invention is constructed so that information is recorded by transferring ink from a thermal transfer ribbon to the surface of a transfer sheet by means of a thermal head, and that a second unit can be swung up to be separated from a first unit as required. Sag of the thermal transfer ribbon is removed by feeding the ribbon for a predetermined length when it is detected that the second unit is set on the first unit. Thus, fusion of ink on the thermal transfer ribbon at the start of recording can be prevented.

6 Claims, 20 Drawing Figures

THERMAL TRANSFER RECORDING APPARATUS

BACKGROUND OF THE INVENTION

The present invention relates to a thermal transfer recording apparatus, more specifically to an improvement of a thermal transfer recording apparatus adapted for use in the recording output of, e.g., a computer, a word processor, and so on.

As an example of non-impact printing techniques, thermal transfer recording apparatuses have recently been developed and put to practical use which can record on ordinary paper. They feature compactness, low price, and low-noise performance.

In one such prior art apparatus starting to be widely used, the whole structure is divided into two parts, an upper unit as a first unit and a lower unit as a second unit, which adjoin each other on a path of a thermal transfer medium. The upper unit can be swung open to be separated from the lower unit as required. In the thermal transfer recording apparatus of this swingable upper unit type, the thermal transfer medium path can be exposed to facilitate the replacement of the thermal transfer medium or the removal of a piece of jammed material. Moreover, the thermal head and other devices arranged along the thermal transfer medium path can be maintained very easily. Thus, thermal transfer recording apparatuses of this type are expected to be widely used.

The conventional thermal transfer recording apparatus of the swingable upper unit type often makes recording errors. If the thermal transfer medium, for example, is replaced with a new one after swinging up the upper unit, the upper unit may possibly be swung down to close the apparatus with the newly set thermal transfer medium left slack. This slack or sag can cause the awkward situation of the beginning portion (for several lines) of information to not be satisfactorily transferred. In this case, ink on the thermal transfer medium is melted crumpling the medium at the start of recording, thereby causing recording errors.

SUMMARY OF THE INVENTION

The present invention is contrived in consideration of these circumstances, and is intended to provide a thermal transfer recording apparatus capable of securely preventing recording errors attributed to the sag of the thermal transfer medium, and affording a stable, clear-cut recording.

In order to attain the above object, a thermal transfer recording apparatus according to the invention is constructed so that information is recorded by transferring ink from a thermal transfer medium to the surface of an objective material by means of a thermal head, and that a second unit can be swung up to be separated from a first unit as required. Sag of the thermal transfer medium is removed by feeding the medium for a predetermined length when it is detected that the second unit is set on the first unit. Thus, fusion of ink on the thermal transfer medium at the start of recording can be prevented.

According to one aspect of the present invention, there is provided a thermal transfer recording apparatus in which ink on a thermal transfer medium is transferred to an objective material for transfer so that information is recorded on the objective material, and which comprises a first unit and a second unit swingably attached thereto, said first unit containing therein holding means holding the thermal transfer medium and take-up means driven by a drive source to wind the thermal transfer medium from the holding means, regulating means for regulating the driving timing of the drive source, and detecting means for detecting that the second unit is set on the first unit and outputting a detection signa, wherein said regulating means, receiving the detection signal from the detecting means, causes the drive source to actuate the take-up means, whereby the thermal transfer medium is wound for a predetermined length.

BRIEF DESCRIPTION OF THE DRAWINGS

FIGS. 1 to 20 show one embodiment of a thermal transfer recording apparatus according to the present invention, in which:

FIG. 1 is a vertical side-sectional view schematically showing the general construction of the apparatus;

FIG. 2 is a block diagram showing a control system of the apparatus;

FIG. 3 is a side view showing internal assemblies of the apparatus;

FIG. 4 is a left-side view showing the internal assemblies in which an upper base-side assembly is open;

FIG. 5 is a right-side view showing the internal assemblies in which the upper base-side assembly is open;

FIG. 6 is a vertical side-sectional view schematically showing the apparatus with an upper unit swung open;

FIG. 7 is a plan view showing a lower base-side assembly;

FIG. 8 is a sectional view showing a supply reel;

FIG. 9 is a sectional view showing one reel unit of a take-up reel;

FIG. 10 is a broken away, plan view showing a paper cassette;

FIG. 11 is a front view of the paper cassette shown in FIG. 10;

FIG. 12 is a plan view showing a hand-feed guide;

FIG. 13 is a side view of the hand-feed guide shown in FIG. 12;

FIG. 14 is a plan view showing the upper base-side assembly;

FIG. 15 is a side view for illustrating the relationship between the quantities of transfer sheets contained in and on the paper cassette and a tray;

FIG. 16 is a side view for illustrating the way a transfer sheet is fed;

FIG. 17 is a perspective view schematically showing a ribbon sag/cut detector;

FIG. 18 is a perspective view schematically showing the terminal end portion of a thermal transfer ribbon;

FIG. 19 is a sectional view showing the thermal transfer ribbon; and

FIG. 20 is a graph showing the change of the sound pressure level of noise depending on the tension on the transfer sheet.

DETAILED DESCRIPTION OF THE PREFERRED EMBODIMENT

One embodiment of a thermal transfer recording apparatus according to the present invention will now be described in detail with reference to the accompanying drawings.

Figure 1:
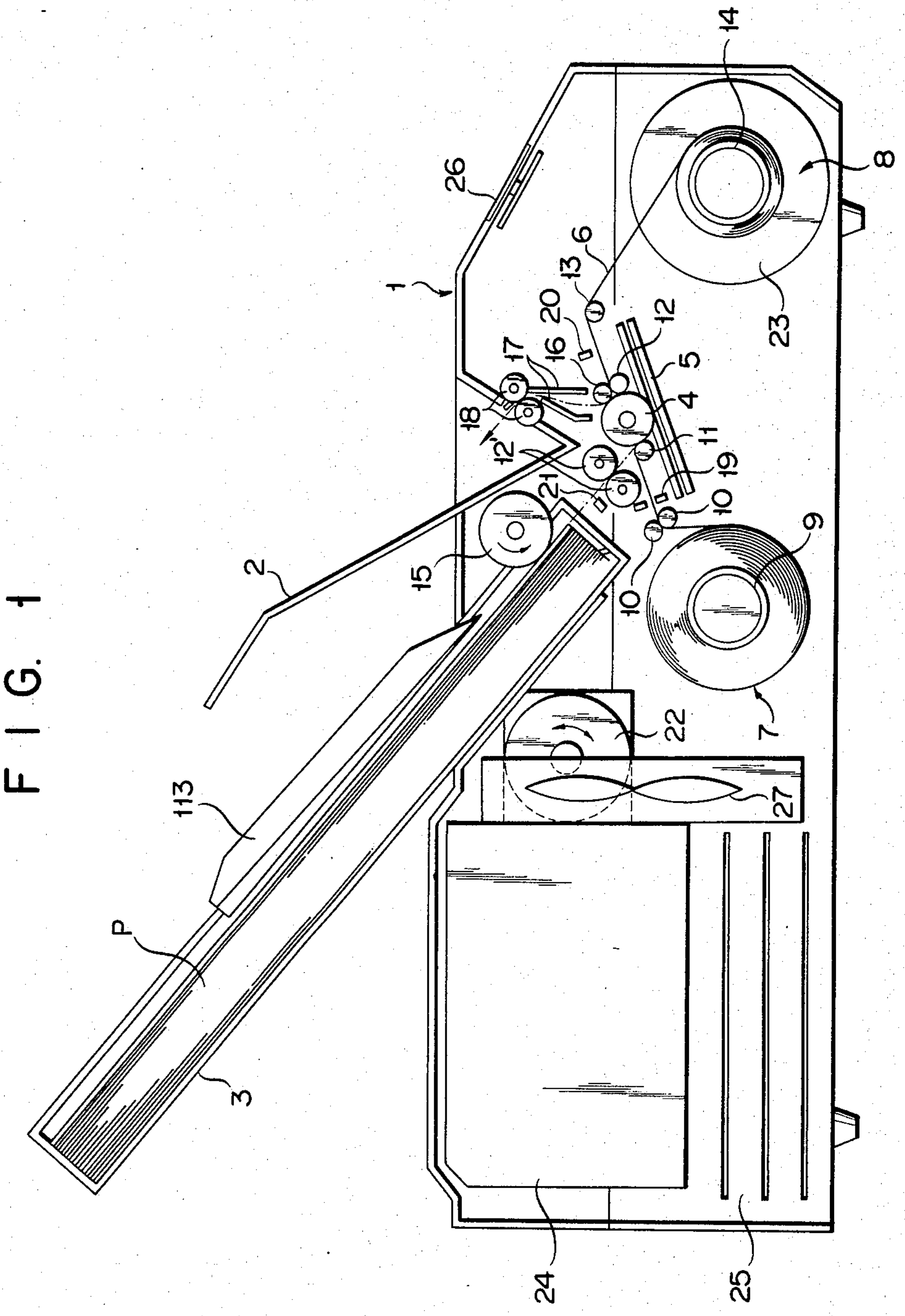

FIG. 1 schematically shows the general construction of the thermal transfer recording apparatus according to the one embodiment. In FIG. 1, numeral 1 designates an apparatus housing. A tray 2 and a paper cassette 3 are attached to the top and rear portions, respectively, of the housing 1. A platen roller 4 is disposed in the position corresponding to the mounting portion of the tray 2 inside the housing 1. Under the platen roller 4 lies a thermal head 5 with a line-dot-shaped heat-generating portion (not shown) which extends along the axis of the platen roller 4.

A ribbon-holding portion 7 as holding means for holding a rolled thermal transfer ribbon 6 as a thermal transfer medium for supply is provided substantially in the center of the interior of the housing 1. Also, a ribbon take-up portion 8 as take-up means for winding the thermal transfer ribbon 6 let out from the ribbon-holding portion 7 is located in the front portion of the interior of the housing 1.

The extreme end of the thermal transfer ribbon 6 which is wound on a roll shaft 9 of the ribbon-holder portion 7 is passed successively around a pair of feed rollers 10 and a guide roller 11, between the platen roller 4 and the thermal head 5, and then turned around a small separation roller 12 so that the end of the ribbon 6 is suddenly removed from the platen roller 4. Afterwards, the thermal transfer ribbon 6 is passed around a guide roller 13, and is wound on a roll shaft 14 of the ribbon take-up portion 8 which defines the ribbon take-up path.

A pair of aligning rollers 12′ are arranged in the vicinity of the guide roller 11. A transfer sheet P as an objective material for transfer (recording medium) delivered from the paper cassette 3 by a takeout roller 15 is fed between the platen roller 4 and the thermal transfer ribbon 6 by the aligning rollers 12′.

A retaining roller 16, a pair of guide plates 17, and a pair of exit rollers 18 are arranged in succession, ranging from the separation roller 12 to the tray 2. The transfer sheet P separated from the thermal transfer ribbon 6 is led to the tray 2 via the retaining roller 16, the guide plates 17, and the exit rollers 18, thus defining a transfer sheet travel path.

A ribbon end detector 19 is disposed between the pair of feed rollers 10 and the guide roller 11 on the ribbon take-up path, while a ribbon sag/cut detector 20 is provided between the separation roller 12 and the guide roller 13. Likewise, a transfer sheet passage detector 21 is disposed between the paper cassette 3 and the pair of aligning rollers 12′.

The takeout roller 15, the aligning rollers 12′, the platen roller 4, the exit rollers 18, and a take-up reel 23 holding the roll shaft 14 are driven by a common pulse motor 22 as a drive source. Numerals 24, 25, 26 and 27 designate a power supply section, a control section, a display/operation input section, and a cooling fan, respectively.

Figure 2:
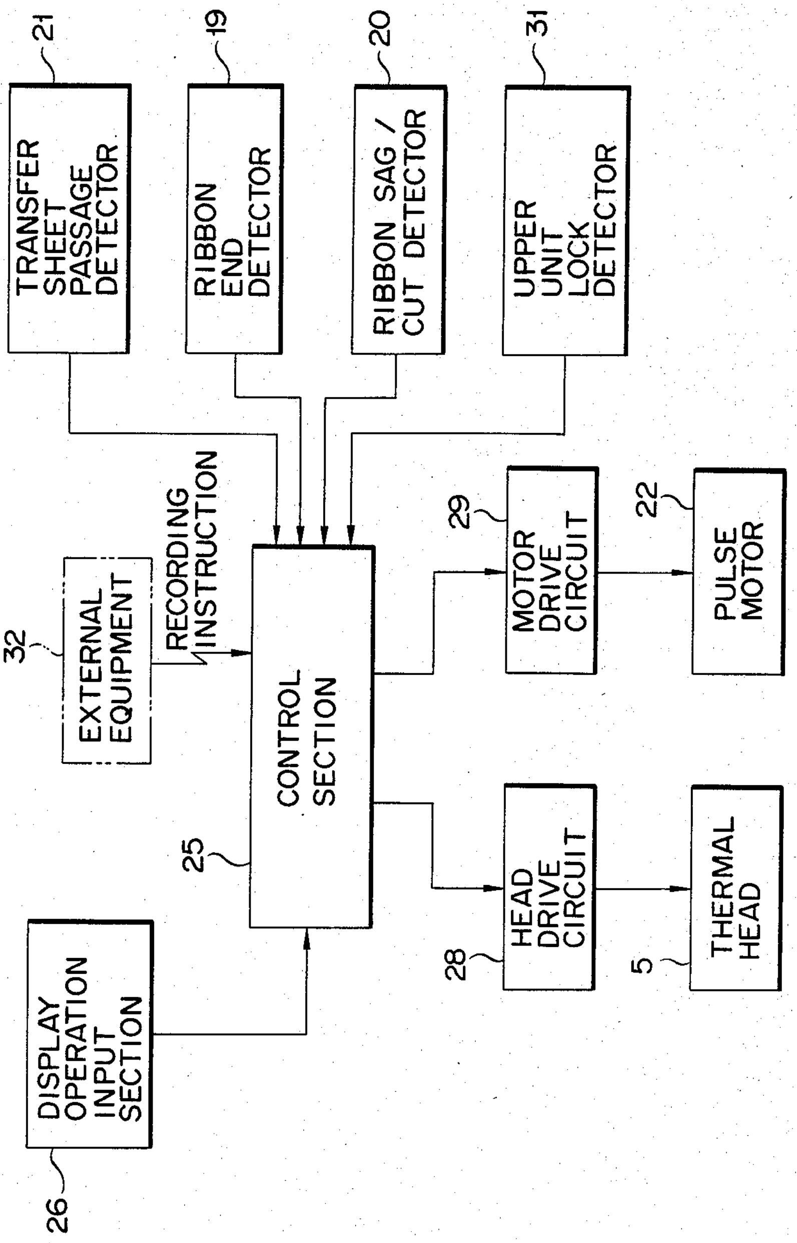

As shown in FIG. 2, the control section 25 is connected to the thermal head 5 and the pulse motor 22 through a head drive circuit 28 and a motor drive circuit 29, respectively. Also, the control section 25 is connected to the transfer sheet passage detector 21, the ribbon end detector 19, the ribbon sag/cut detctor 20, the display operation input section 26, an upper unit lock detector 31 operated in association with a power switch 30 mentioned later, and finally to any external equipment 32 such as a computer, word processor or the like.

Constructed in this manner, the thermal transfer recording apparatus starts recording on the transfer sheet P when a recording instruction is issued from the external equipment 32. Namely, the pulse motor 22 is started in response to the recording instruction, and the driving force of the pulse motor 22 is transmitted in the manner described later. Thus, the takeout roller 15 rotates in the counterclockwise direction of FIG. 1, so that the transfer sheets P in the paper cassette 3 are taken out one after another. Each transfer sheet P, taken out in this manner, abuts against the rolling contact portions of the pair of aligning rollers 12′ so that its forward end is aligned by the contact portions.

In a predetermined period of time after the passage of the forward end of the transfer sheet P is detected by the transfer sheet passage detector 21, the pulse motor 22 is reversed. As the driving force is transmitted, the aligning rollers 12′ are rotated to feed the transfer sheet P to the position where the thermal transfer ribbon 6 is held between the platen roller 4 and the guide roller 11. Thereafter, the transfer sheet P is delivered to the heat-generating portion of the thermal head 5, held between the platen roller 4 and the thermal transfer ribbon 6. In the vicinity of the heat-generating portion, the thermal head 5, the thermal transfer ribbon 6, the transfer sheet P, and the platen roller 4 are in close contact with one another.

When the transfer sheet P reaches the heat-generating portion of the thermal head 5, the thermal head 5 starts the thermal recording with a predetermined timing. Namely, in the vicinity of the heat-generating portion, ink on the thermal transfer ribbon 6 is melted by the heat of the thermal head 5 and transferred to the surface of the transfer sheet P. As the thermal head 5 performs the recording operation while the thermal transfer ribbon 6 and the transfer sheet P are traveling, prescribed items are recorded on the transfer sheet P.

The transfer sheet P is separated from the thermal transfer ribbon 6 by the separation roller 12, and is discharged onto the tray 2 via the retaining roller 16, the guide plates 17, and the exit rollers 18. Meanwhile, the thermal transfer ribbon 6 is passed around the guide roller 13 and wound on the roll shaft 14 of the ribbon take-up portion 8.

Figure 3:
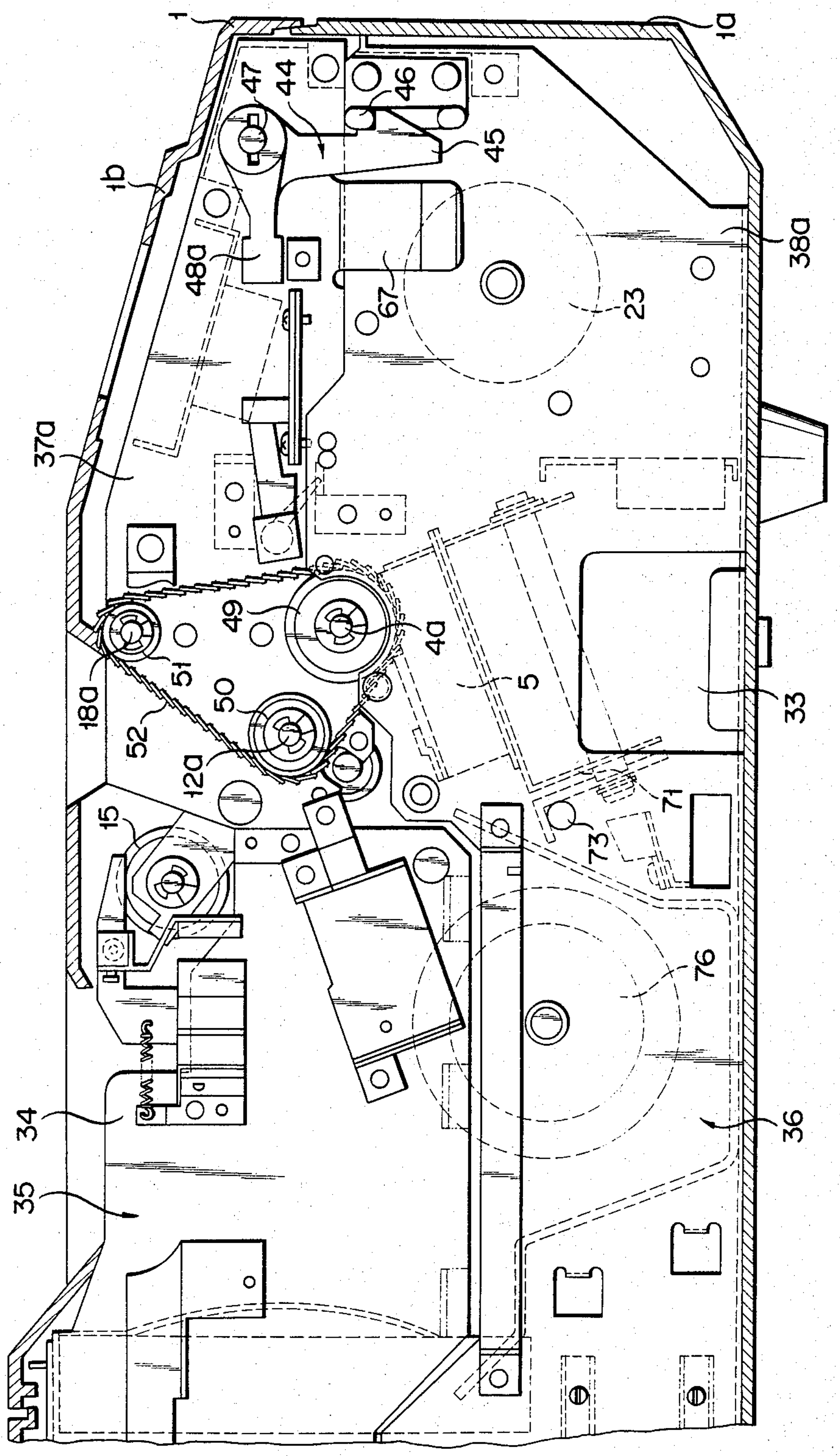

In the thermal transfer recording apparatus of the present embodiment, as shown in detail in FIG. 3, the housing 1 is divided into two parts, lower and upper covers 1*a* and 1*b*. Also, the internal mechanism of the apparatus is divided into two parts, the lower and upper base-side assemblies 33 and 34 which correspond to the lower and upper covers 1*a* and 1*b*, respectively. Thus, the apparatus of the embodiment is composed of an upper unit 35 as a second unit including the upper cover 1*b* and the upper base-side assembly 34 and a lower unit 36 as a first unit including the lower cover 1*a* and the lower base-side assembly 33.

Figure 4:
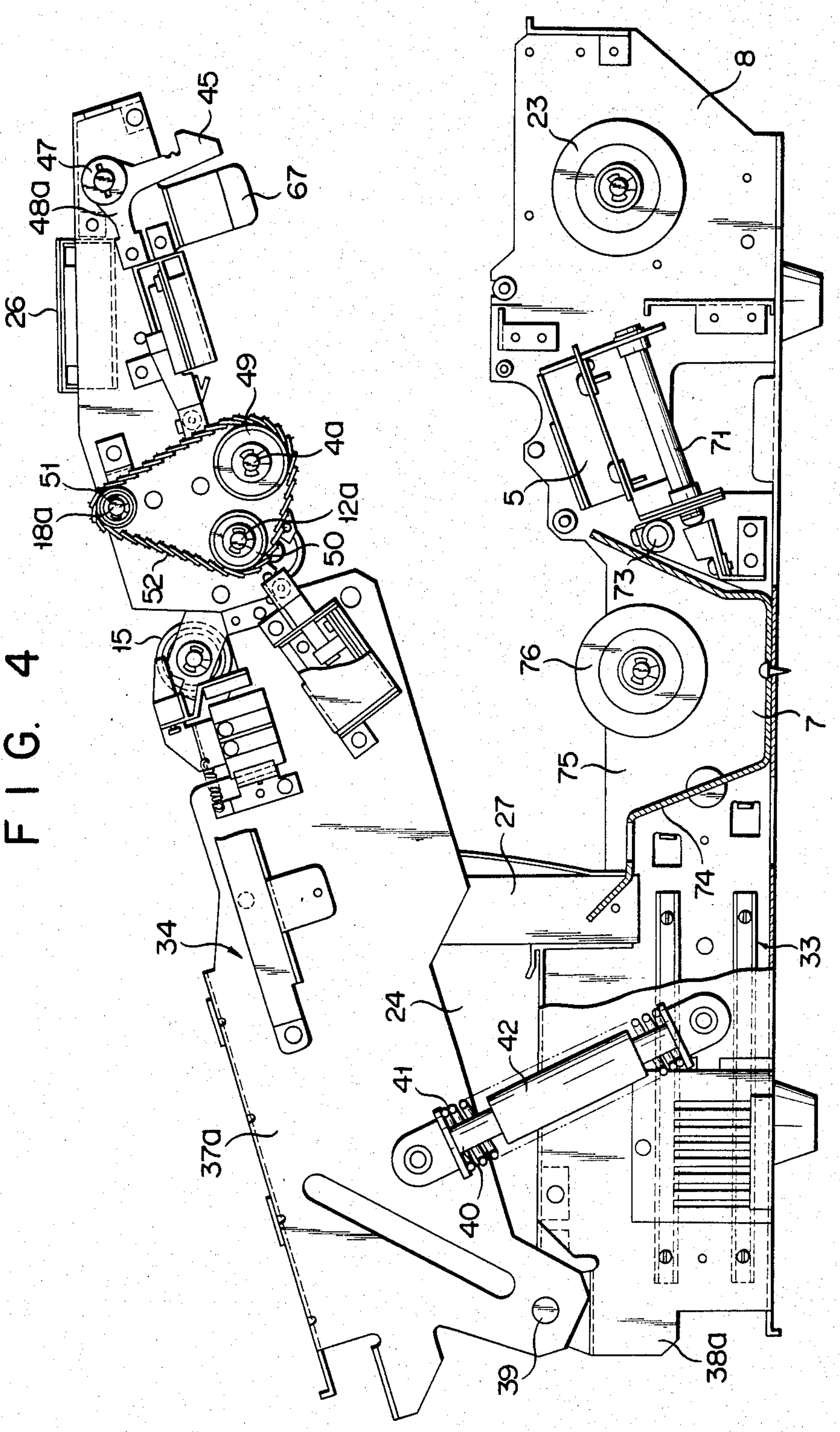
Figure 5:
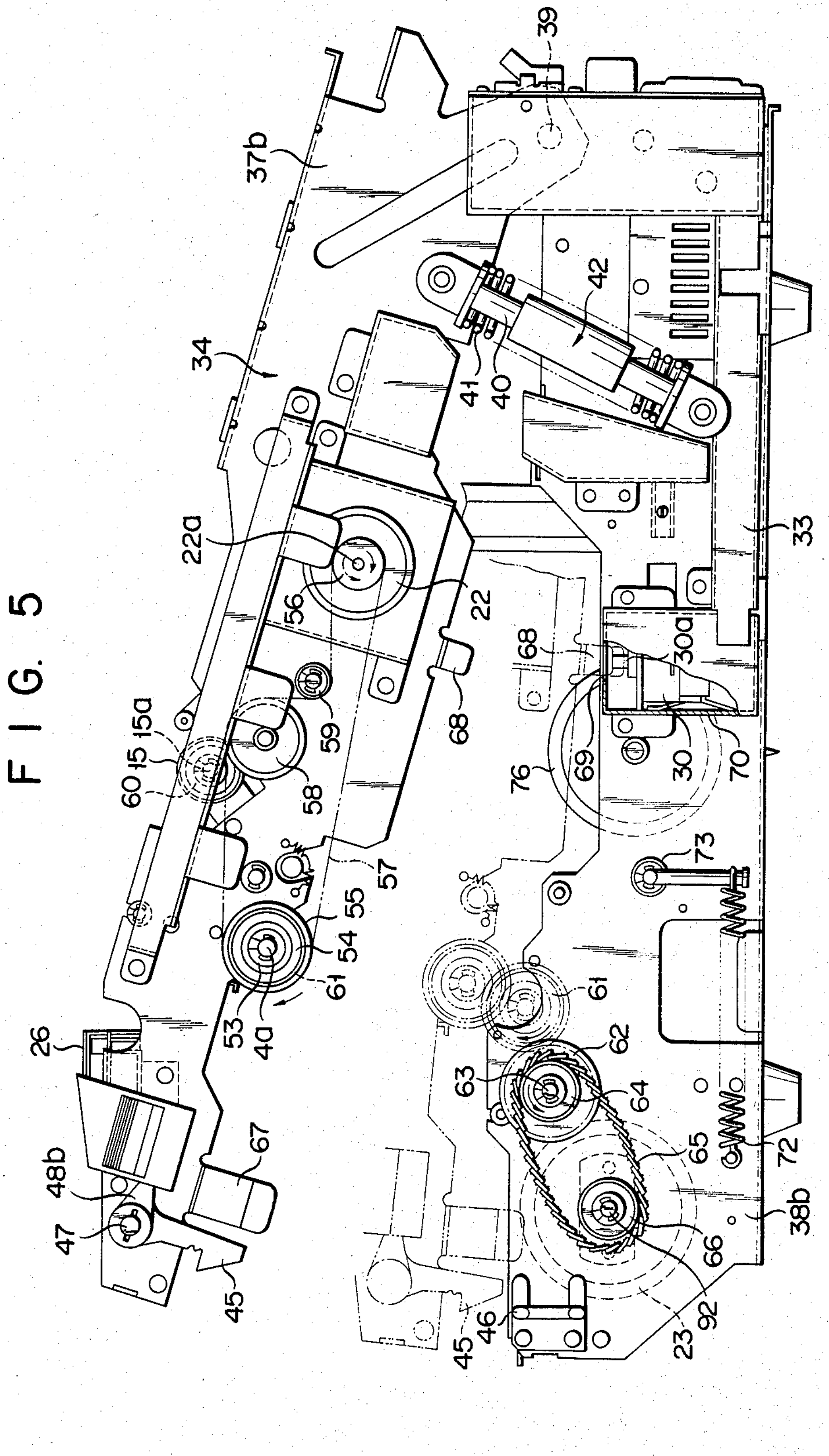
Figure 6:
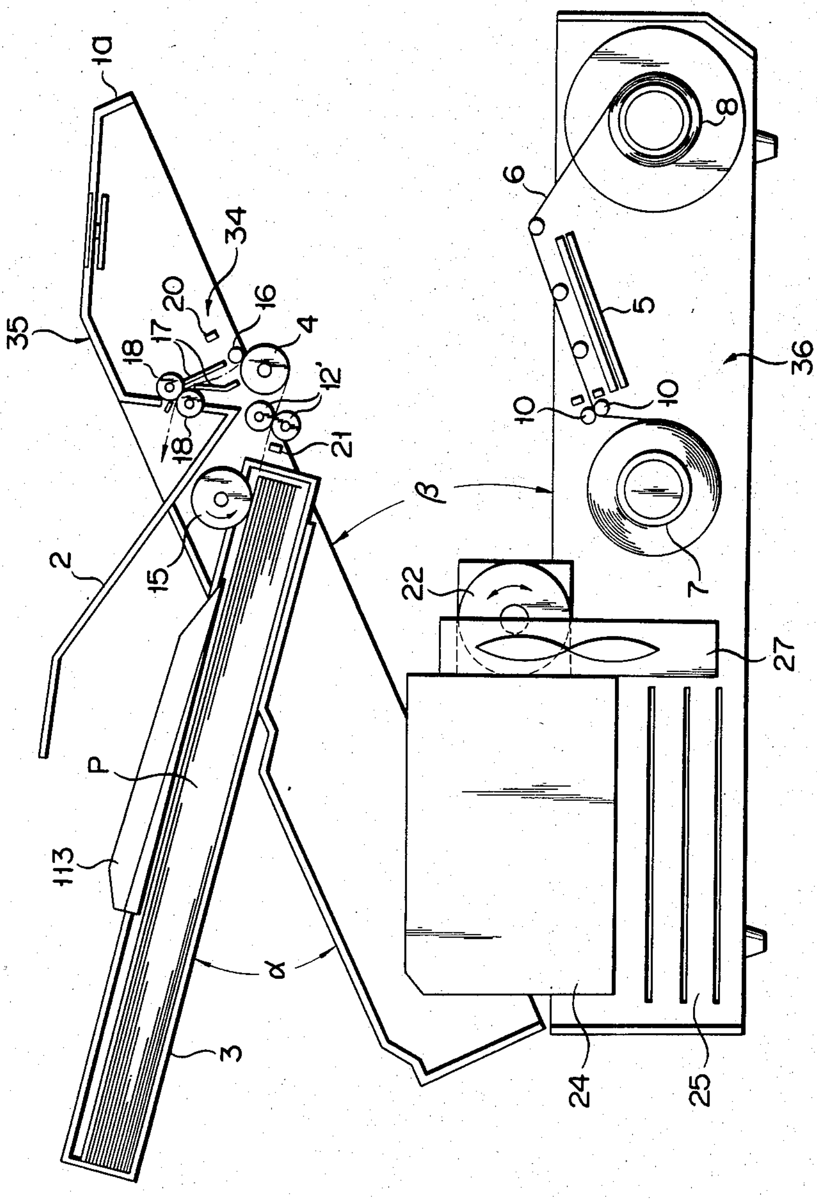

As shown in FIGS. 4 and 5, the upper base-side assembly 34 has a pair of side frames 37*a* and 37*b*, while the lower base-side assembly 33 has another pair of side frames 38*a* and 38*b*. The respective one-end portions of the upper and lower side frames 37*a* (37*b*) and 38*a* (38*b*) are swingably coupled by means of a pivot 39. A pair of lift mechanisms 42 each formed of a guide rod 40 and a compression spring 41 are connected to the upper side frames 37*a* and 37*b* and the lower side frames 38*a* and 38*b*. Thus, the upper base-side assembly 34 is continually urged upward by the lift mechanisms 42. Constructed in this manner, the upper unit 35 including the upper base-side assembly 34 and the upper cover 1*a* covering the same can be swung upward, as shown in FIG. 6.

The upper unit 35 incorporates the paper cassette 3, takeout roller 15, aligning rollers 12′, platen roller 4, retaining roller 16, guide plates 17, exit rollers 18, tray 2, transfer sheet passage detector 21, and ribbon sag/cut detector 20. If the upper unit 35 is swung up or removed from the lower unit 36, the ribbon take-up path is exposed entirely. Such exposure greatly facilitates the maintenance of the elements arranged along the ribbon take-up path, as well as the replacement and maintenance of the thermal transfer ribbon 6.

If the upper unit 35 is swung open, the transfer sheet travel path is also fully opened. Thus, jamming of the transfer sheet P, if any, can be righted with ease. When the upper unit 35 is swung up, the angle $\alpha$ between the paper cassette 3 and the upper unit 35 is not narrower than the angle $\beta$ between the upper and lower units 35 and 36, that is, $\alpha \geqq \beta$. When the apparatus is open, therefore, the paper cassette 3 is always kept in a horizontal position or is somewhat erected. Thus, the paper cassette 3 and the transfer sheets P therein are kept from dislocation. The operating efficiency of the apparatus is improved because the paper cassette 3 need not expressly be held down in swinging the upper unit 35.

The free-end side of the upper unit 35 is normally fixed to the lower unit 36 by a lock mechanism 44, as shown in FIG. 3. The lock mechanism 44 prevents the upper unit 35 from being unexpectedly swung up by any external force. Namely, as also shown in FIGS. 4 and 5, a hook 45 is provided on the free-end side of the upper base-side assembly 34, while a hook stop bar 46 to catch the hook 45 is attached to that portion of the lower base-side assembly 33 which faces the hook 45. If the free-end side of the upper base-side assembly 34 is pressed down against the lifting force of the lift mechanisms 42, the hook 45 is caught by the hook stop bar 46, as shown in FIG. 3.

The hook 45 is attached to a hook mounting bar 47. The hook 47 is disengaged from the hook stop bar 46 when the hook mounting bar 47 is rocked by the hook release, levers 48*a* and 48*b* at both ends thereof. As a result of such a disengagement, the upper unit 35 is automatically swung up by the lifting force of the lift mechanisms 42.

Referring now to FIGS. 4 and 5, a power transmission system for transmitting the driving force of the pulse motor 22 to the rollers will be described.

As shown in FIG. 4, sprockets 49, 50 and 51 are mounted on the respective one-end portions of a platen roller shaft 4*a* fitted with the platen roller 4; an aligning roller shaft 12*a* fitted with the aligning rollers 12′; and an exit roller shaft 18*a* fitted with the exit rollers 18. The sprockets 49, 50 and 51 are interlocked by means of an endless chain 52 passed around them. Thus, when the platen roller shaft 4*a* is driven, the platen roller 4, the aligning rollers 12′, and the exit rollers 18 are all driven at the same time.

As shown in FIG. 5, a first driven gear 55 is mounted on the other end portion of the platen roller shaft 4*a* by means of a one-way clutch 53 and a rubber layer 54. The first driven gear 55 and a driving gear 56 mounted on a drive shaft 22*a* of the pulse motor 22 are interlocked by means of an endless toothed belt 57. The toothed belt 57 is also passed around a second driven gear 58 and a tension gear 59. Thus, the second driven gear 58 is driven as the pulse motor 22 is driven. The second driven gear 58 and a takeout roller shaft 15*a* fitted with the takeout roller 15 by means of a one-way clutch 60 are interlocked by means of a gear mechanism (not shown).

When the drive shaft 22*a* of the pulse motor 22 is rotated in the forward direction, its driving force is transmitted to the takeout roller shaft 15*a* via the toothed belt 57, the second driven gear 58 and the gear mechanism (not shown). Further, the driving force of the takeout roller shaft 15*a* is transmitted to the takeout roller 15 through the one-way clutch 60. When the drive shaft 22*a* of the pulse motor 22 is rotated in the reverse direction, its driving force is transmitted to the platen roller shaft 4*a* via the toothed belt 57, the first driven gear 55, the rubber layer 54 and the one-way clutch 53. Further, the driving force is transmitted to the platen roller 4, the aligning rollers 12′ and the exit rollers 18 in the aforesaid manner.

As indicated by two-dot and dashed line in FIG. 5, a third driven gear 61 formed integrally with the first driven gear 55 on the upper base-side assembly 34 is adapted to mesh with a fourth driven gear 62 on the lower base-side assembly 33 to transmit the rotatory force of the pulse motor 22 to the fourth driven gear 62 when the upper and lower units 35 and 36 are joined together. The fourth driven gear 62 is mounted on a rotating shaft 63. The rotary force of the fourth driven gear 62 is transmitted to a drive shaft 92 of the take-up reel 23 via the rotating shaft 63, a sprocket 64, a chain 65, and a sprocket 66. Thus, the roll shaft 14 wound with the thermal transfer ribbon 6 (as will be mentioned later) is rotated in the winding direction.

As shown in FIGS. 4 and 5, a pair of positioning guide pieces 67 protrude individually from the under surfaces of the free ends of the side frames 37*a* and 37*b* of the upper base-side assembly 34. When the upper unit 35 is set on the lower unit 36, the guide pieces 67 are located outside the side frames 38*a* and 38*b* of the lower base-side assembly 33. Thus, the upper base-side assembly 34 is securely guided to a predetermined position on the lower base-side assembly 3.

As shown in FIG. 5, a switch push piece 68 which serves also as a guide protrudes from the under surface of the intermediate portion of the side frame 37*b* of the upper base-side assembly 34. The switch push piece 68 presses an operator 30*a* of the power switch (AC switch) 30 in the lower base-side assembly 33 when the upper and lower units 35 and 36 are joined together. The power switch 30 is surrounded by a protective case 70 having a slit 69 through which the push piece 68 can pass. Therefore, if the upper base-side assembly 34 is dislocated, the lower-end portion of the push piece 68 is prevented from getting into the slit 69, and abuts against the top surface of the case 70. Thus, the upper base-side assembly 34 is restrained from further swinging down, so that the power switch 30 is prevented from being turned on.

If the upper and lower units 35 and 36 are joined together so that the switch push piece 68 passes through the sit 69 to press the operator 30*a* of the power switch 30, the power switch 30 is turned on. As the power switch 30 is turned on, the upper unit lock detector 31 is actuated, so that the control section 25 causes the motor drive circuit 29 to rotate the pulse motor 22 reversely for a predetermined time. Accordingly, the driving force of the pulse motor 22 is transmitted to the drive shaft 92 of the take-up reel 23 via the toothed belt 57, first driven gear 55, third driven gear 61, fourth driven gear 62, rotating shaft 63, sprocket 64, chain 65, and sprocket 66. Namely, when the upper unit lock detector 31 detects that the upper unit 35 is set on the lower unit 36, the drive shaft 92 of the take-up reel 23 is driven for a predetermined time to feed the thermal transfer ribbon 6 for a predetermined length. Since the sag of the thermal transfer ribbon 6 at the time of setting is absorbed in this manner, recording errors attributed to such sag can securely be prevented without detracting from the ease of maintenance. Thus, clear-cut recording can be achieved with stability.

Figure 7:
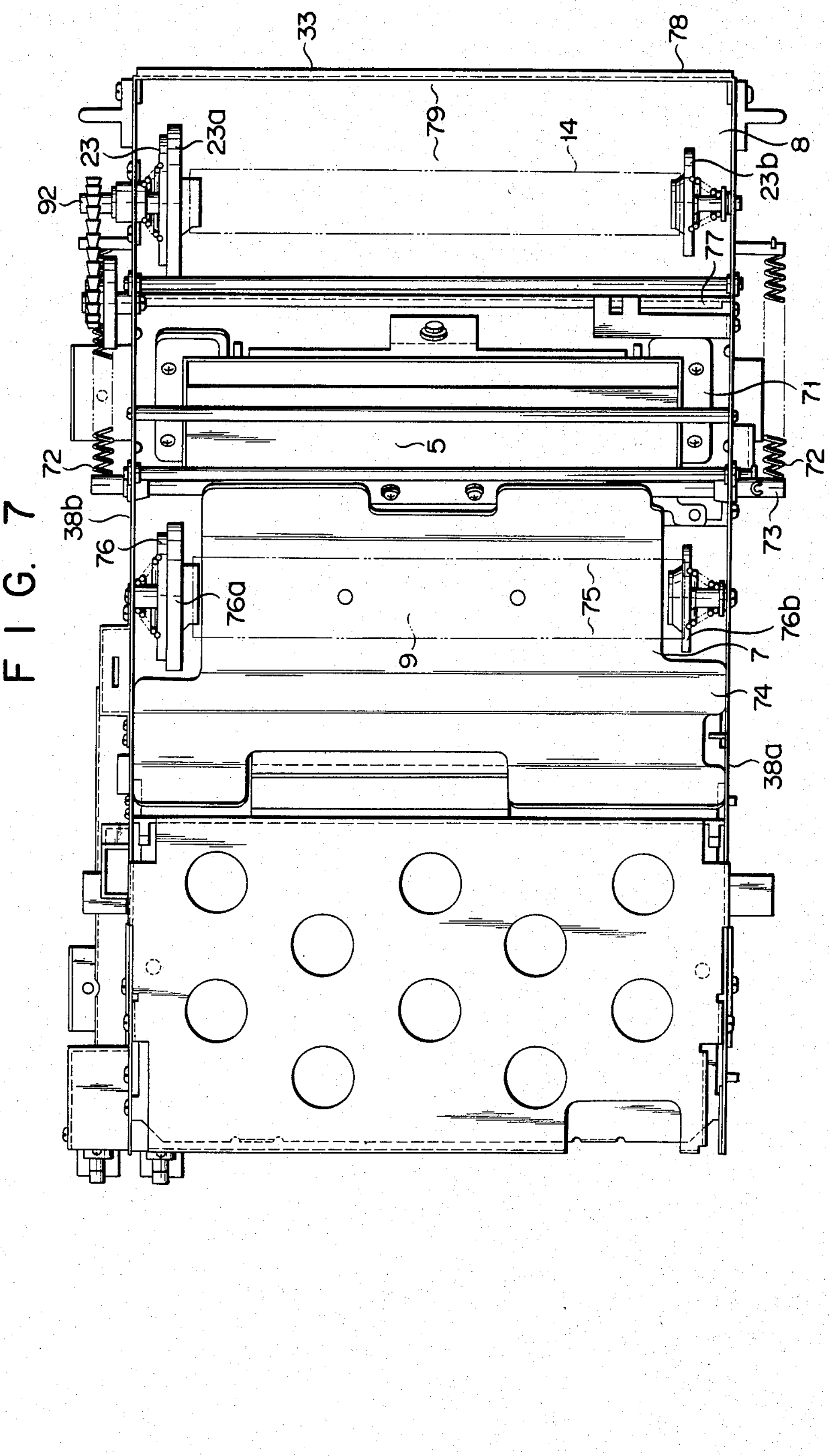

FIG. 7 is a plan view of the lower base-side assembly 33. As also seen from FIG. 4, the thermal head 5 is disposed between the ribbon-holding portion 7 and the ribbon take-up portion 8, and is supported by a head support mechanism 71 so as to be longitudinally rockable. The head support mechanism 71 is attached to a head support shaft 73 which is continually urged to rock in a fixed direction by a pair of head lift springs 72. Thus, the thermal head 5 is held against the platen roller 4 under a uniform pressure.

As shown in FIG. 4, the ribbon-holding portion 7 includes a space portion 75 defined by a guide plate 74 with a substantially U-shaped section, and a supply reel 76 holding the roll shaft 9 inside the space portion 75. As shown in FIG. 7, the ribbon take-up portion 8 includes a space portion 79 defined between a pair of guide plates 77 and 78, and the take-up reel 23 holding the roll shaft 14 inside the space portion 79.

The supply reel 76 includes a first reel unit **76*a* holding one end of the roll shaft 9 and a second reel unit 76*b* holding the other end of the roll shaft 9. Likewise, the take-up reel 23 includes a third reel unit 23*a* holding one end of the roll shaft 14 and a fourth reel unit 23*b* holding the other end of the roll shaft 14**.

Figure 8:
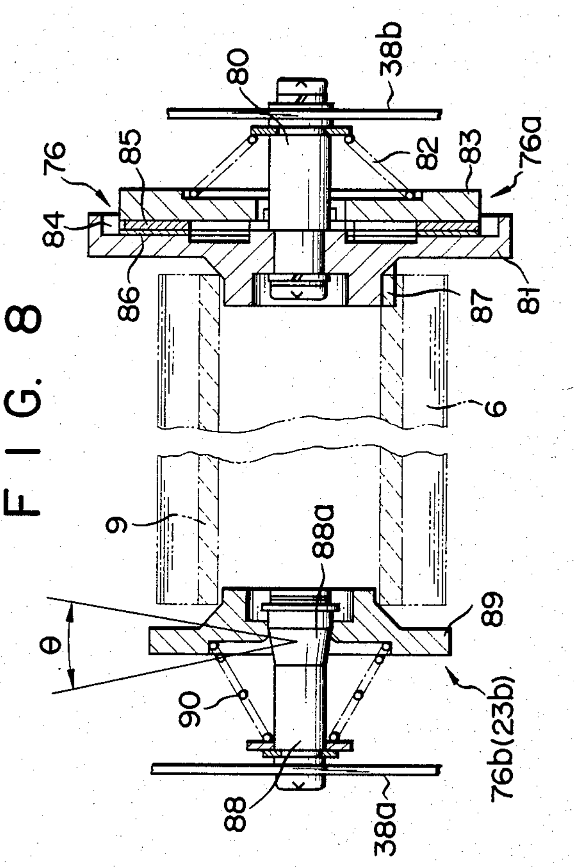

Referring now to FIG. 8, the constructions of the first and second reel units **76*a* and 76*b* will be described. The first reel unit 76*a* includes: a first reel body 81 rotatably mounted on a first support shaft 80, one end of which is fixed to the side frame 38*b*; a disk 83 continually pressed against the lateral face of the first reel body 81 by a trapezoidal coil spring 82; and a brake member 84 provided on the opposed faces of the disk 83 and the first reel body 84. The brake member 84 is formed of a stainless-steel pad 85 fixed on the face of the disk 83 and a polyester-based non-woven fabric (trade name: Excene, Toray Co., Ltd.) fixed on the face of the first reel body 81**.

From the reel body 81 protrudes a rotation preventing projection 87 which can engage an indentation formed in the end face of the roll shaft 9. When the projection 87 engages the indentation, the roll shaft 9 and the first reel body 81 rotate together without a slip between them.

The second reel unit **76*b* includes a second reel body 89 rotatably mounted on a second support shaft 88 one end of which is fixed to the side frame 38*a*, and a trapezoidal coil spring 90 continually pressing the second reel body 89 toward the first reel unit 76*a*. In FIG. 8, the second reel body 89 holds the end portion of the roll shaft 9**.

The second support shaft 88 of the second reel unit **76*b* is gradually reduced in diameter from the other end thereof to the middle portion. Thus, a taper portion 88*a* is formed at the other end portion of the second support shaft 88. Owing to the taper portion 88*a*, the second reel body 89 can rock within an angular range $\theta$, facilitating the attachment and removal of the roll shaft 9**.

With this arrangement, the roll shaft 9 held at both ends by the first and second reel units **76*a* and 76*b* does not rotate unless it is subjected to a certain force attributed to the frictional resistance of the brake member 84. Thus, the thermal transfer ribbon 6 on the roll shaft 9 is prevented from being unexpectedly let out. Also, a certain amount of back tension is applied to the thermal transfer ribbon 6** to keept it sag-free.

Figure 9:
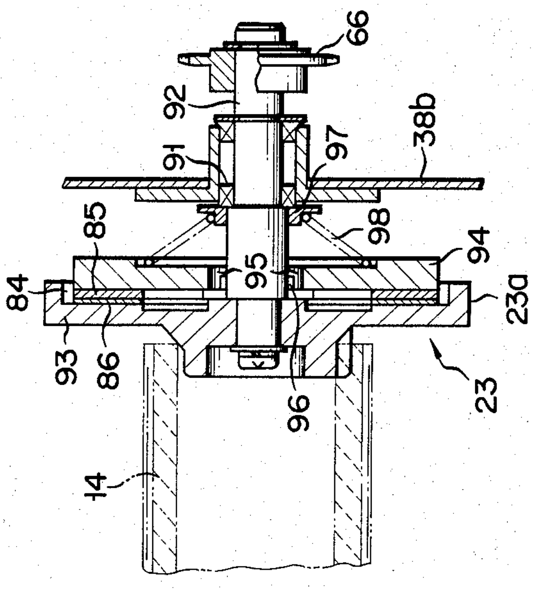

Description of the fourth reel unit **23*b* holding the other end portion of the take-up-side roll shaft 14 will be omitted, since the fourth reel unit 23*b* has the same construction as the second reel unit 76*b* holding the other end portion of the supply-side roll shaft 9. Referring now to FIG. 9, the third reel unit 23*a*** will be described.

A bearing 91 is attached to the side frame **38*b* in a penetrating manner. A drive shaft 92 is rotatably supported on the side frame 38*b* with the aid of the bearing 91. The sprocket 66 is fitted on one end of the drive shaft 92 located inside the side frame 38*b*, while a reel body 93 is rotatably mounted on the other end located inside the side frame 38*b*. A disk 94 is also put on the drive shaft 92, facing the outer surface of the reel body 93. A pair of engaging indentations 95 are formed in the inner peripheral surface of a through hole of the disk 94 penetrated by the drive shaft 92. Both end portions of a pin 96 radially penetrating the drive shat 92 engage the engaging indentations 95, individually. Thus, the drive shaft 92 rotates together with the disk 94. As in the first reel unit 76*a*, a brake member 84 formed of a stainless-steel pad 85 and a polyester-based non-woven fabric 86 is provided on the opposed faces of the reel body 93 and the disk 94. Therefore, the rotatory force of the disk 94 is transmitted to the reel body 93 through the brake member 84. A spring bearing 97 is fitted on the drive shaft 92. The disk 91 is pressed toward the reel body 93 by a trapezoidal coil spring 98 whose narrower end portion is held by the spring bearing 97**.

Since the stainless-steel pad 85 and the polyester-based non-woven fabric 86 are used for the brake members 84 of the supply and take-up reels 76 and 23, torque transmission may be achieved with high stability. Since the trapezoidal coil springs 82, 90 and 98 are used for the backup springs for pressing the sliding surfaces of the brake members 84, the space for the springs is greatly reduced. Accordingly, the reel units **76*a*, 76*b*, 23*a* and 23*b* can be thinned. Moreover, the displacement of the members pressed by the trapezoidal coil springs can be made relatively large, so that the attachment and detachment of the roll shafts 9 and 14** are much facilitated.

Figure 11:
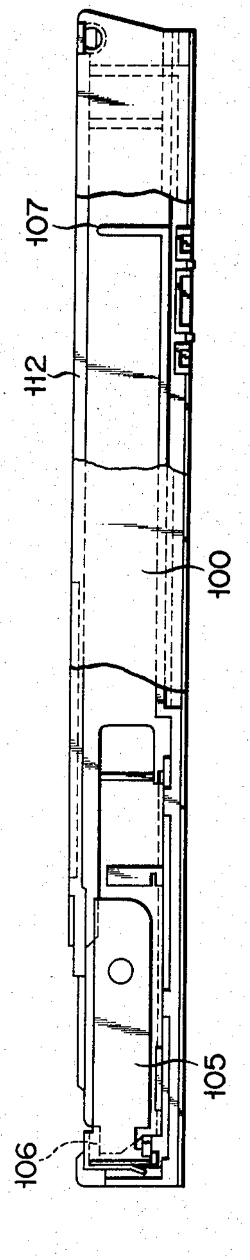
Figure 10:
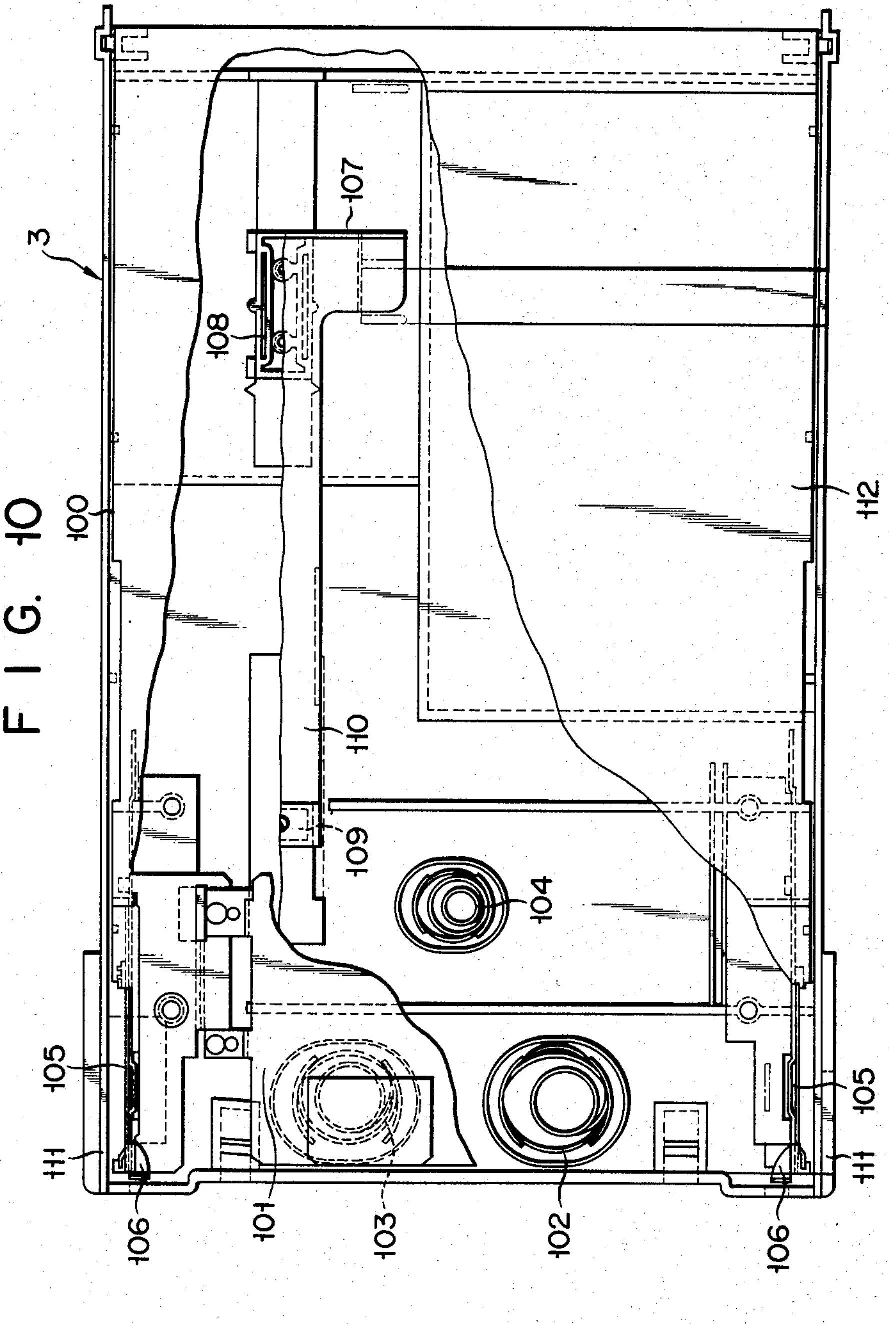

FIGS. 10 and 11 are a plan view and a front view, respectively, partially sectioned, showing the paper cassette 3. In FIGS. 10 and 11, numeral 100 designates a cassette housing. An intermediate plate 101 for supporting the delivery-side end portion of the transfer sheet P contained in the cassette housing 100 is disposed in the front portion (left side of FIG. 10) of the interior of the cassette housing 100. The intermediate plate 101 is continually pushed upward by three intermediate plate lift springs 102, 103 and 104. Thus, both corner portions of the delivery-side end of the uppermost transfer sheet P are caused to abut against a pair of separation claws 106 that are rockably supported by a pair of levers 105.

A stopper 107 for backing up the rear end of the transfer sheet P in the cassette housing 100 is disposed in the rear portion of the interior of the cassette housing 100. The stopper 107 can move longitudinally (from side to side in FIG. 10), and can be fixed by a positioning mechanism 108 to any of positions corresponding to three sizes of transfer sheets P; letter, A-4 and legal. The stopper 107 is coupled with a connecting rod 110 with a magnet 109 at its front end portion. The position of the magnet 109 is magnetically detected by a detector (not shown) provided in the upper base-side assembly 34. As a result, the size of the transfer sheets P can be detected automatically. A pair of guide frames 111 are attached individually to both sides of the front portion of the cassette housing 100.

Numeral 112 designates a cover which hangs over the whole top face of the cassette housing 100 except the front end portion. The cover 112 is removably attached to the cassette housing 100.

Figure 12:
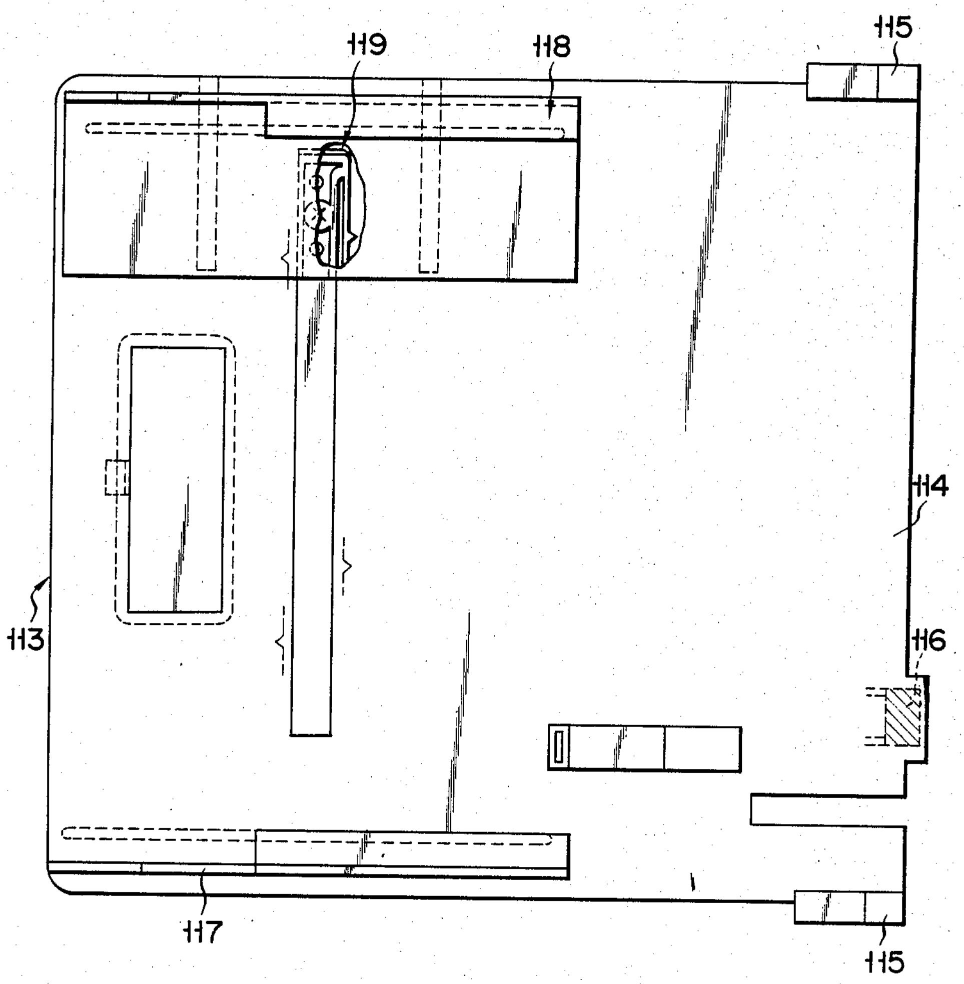
Figure 13:
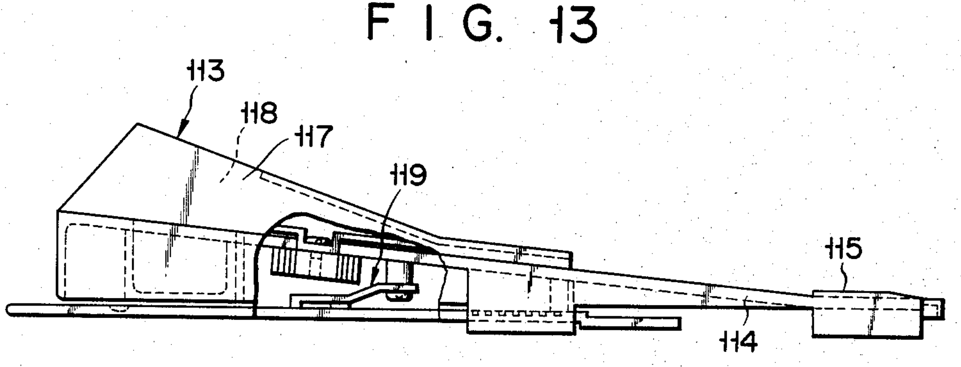

FIGS. 12 and 13 show a hand-feed guide 113 which can slide longitudinally over the cover 112 of the paper cassette 3. A pair of roller lift guides 115 is provided at both the side portions of the front-end side (right-end side of FIG. 12) of a guide housing 114 of the hand-feed guide 113. A magnet 116 is attached to the middle portion of the front end of the guide housing 114. The position of the magnet 116 is magnetically detected by a detector (not shown) provided in the upper base-side assembly 34. This detection tells if the hand-feed guide 113 is in the correct position for manual feed. A reference guide member 117 and a movable guided member 118 are attached to one and the other sides of the guide housing 114. The movable guide member 118 can slide in the direction perpendicular to the direction of the manual feed, and can be fixed by a lock mechanism 119 to any of positions corresponding to the size of the transfer sheets P.

Figure 14:
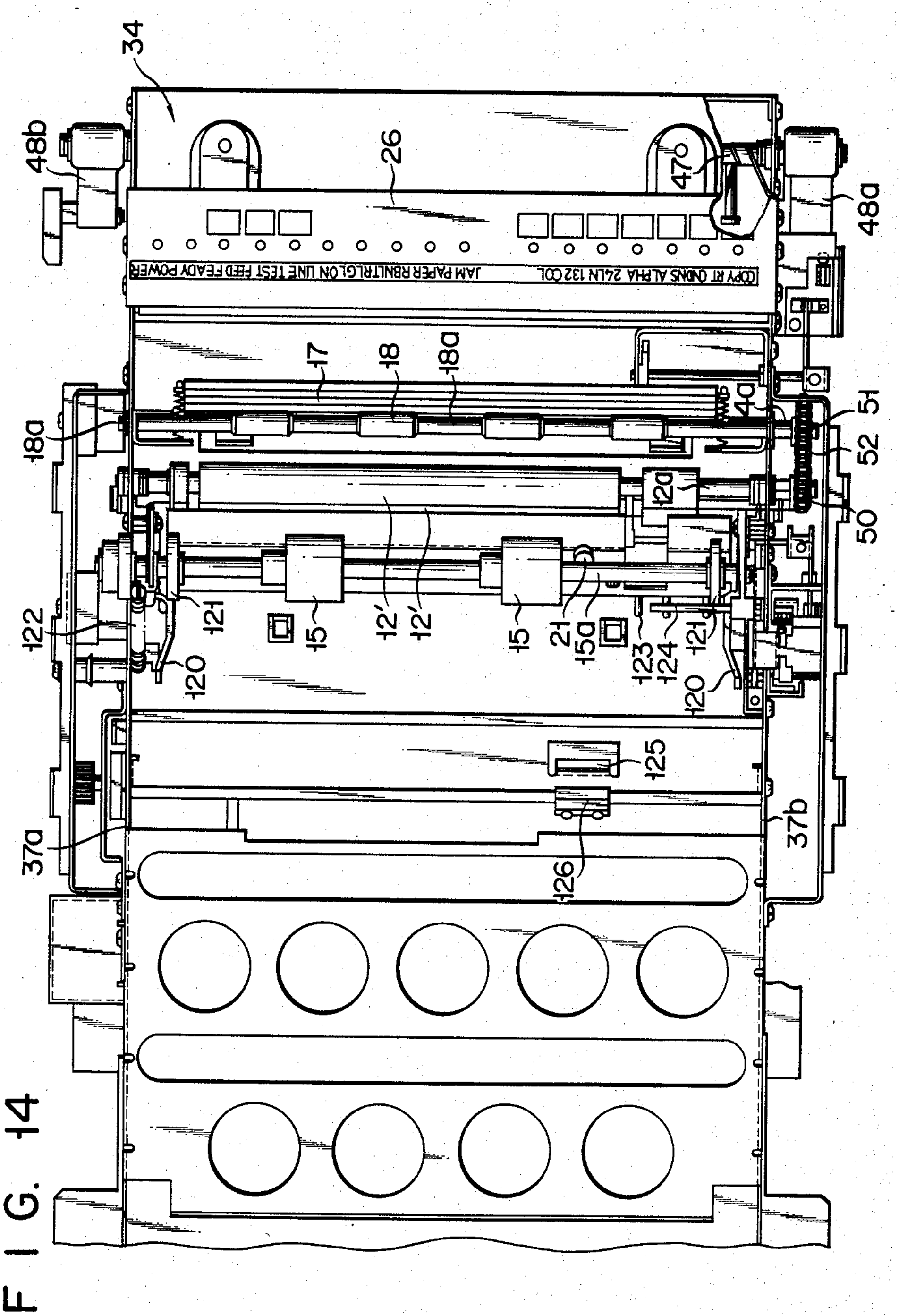

FIG. 14 is a plan view of the upper base-side assembly 34. A pair of cassette guides 120 for guiding the pair of guide frames 111 at both side portions of the front end of the paper cassette 3 are provided at both side portions of the region where the front end portion of the paper cassette 3 is inserted. The paper cassette 3 is held in position by the cassette guides 120. A pair of guide rollers 121 are mounted on both end portions of the takeout roller shaft 15*a* near the cassette guides 120. As the hand-feed guide 113 is pushed in toward the takeout roller 15, the roller lift guides 115 get under the guide rollers 121, so that the takeout roller shaft 15*a* is lifted up against the urging force of a takeout roller shaft depressing spring 122. Thereupon, gears of a gear mechanism (not shown) are disengaged from one another, so that the rotatory force of the pulse motor 22 ceases to be transmitted to the takeout roller shaft 15*a*.

Numerals 123 and 124 designate a detection lever for detecting the existence of manually fed sheet(s) and a paper-empty detection lever, respectively. Numerals 125 and 126 designate paper size sensors located corresponding to the set positions for the stopper 107 of the paper cassette 3. The drive of the takeout roller shaft 15*a* and other elements is controlled by positioning the stopper 107.

Figure 15:
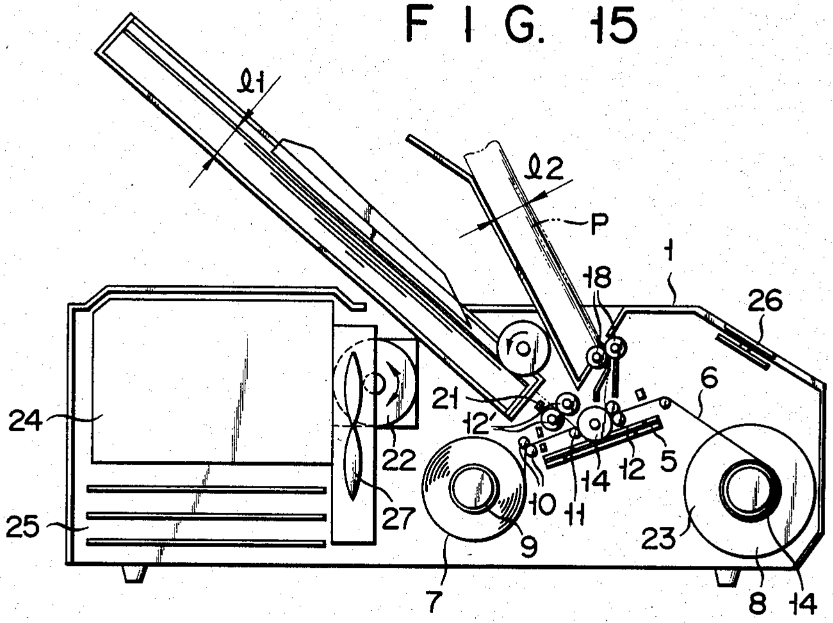

If the quantities of transfer sheets P in and on the paper cassette 3 and the tray 2 are $l_1$ and $l_2$, respectively, there is a relationship, $l_1 \leqq l_2$, as shown in FIG. 15. This relationship permits unattended operation.

Figure 16:
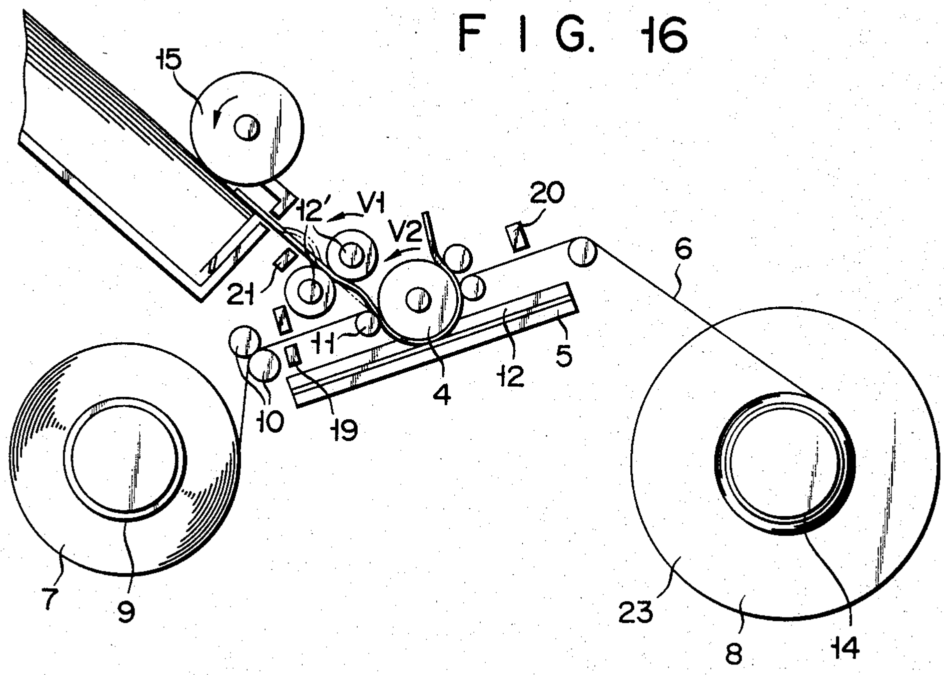

As shown in FIG. 16, the traveling speed v1 of the transfer sheet P provided by the aligning rollers 12' is higher than the traveling speed v2 of the transfer sheet P provided by the platen roller 4, that is v1>v2. Thus, if the transfer sheet P is fed for 35 cm, for example, the rear end of the transfer sheet P is advanced for extra 1 cm or thereabout. The difference between the traveling speeds v1 and v2 is set according to the differences in the number of teeth and diameter between the sprockets 49 and 50. Thus, the traveling transfer sheet P is somewhat bent between the aligning rollers 12' and the platen roller 4.

Since the transfer sheet P is bent in this manner, vibration attributed to the intermittent drive of the pulse motor 22 is prevented from being transmitted to the transfer sheet P. Namely, vibration of the transfer sheet P caused by the pulse motor 22 is reduced to minimize noise.

Figure 20:
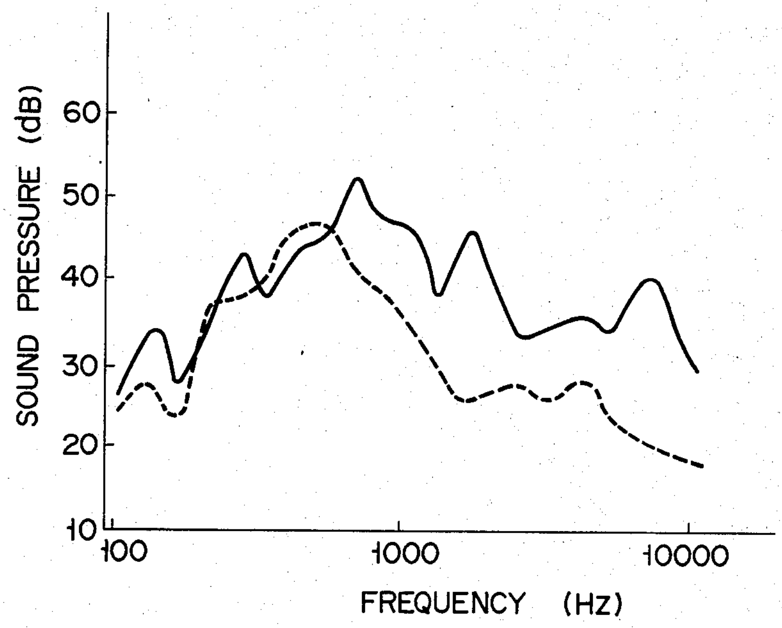

The reduction of noise is indicated by an experiment. In FIG. 20 showing the change of the sound pressure level of noise, a solid line represents the case where the transfer sheet P is strained, while a broken line represents the case where the transfer sheet P is loose. As seen from these curves, the sound pressure level of noise for the loose transfer sheet P is about 9 dB (60 dB−51 dB) lower than that for the strained transfer sheet P.

Figure 17:
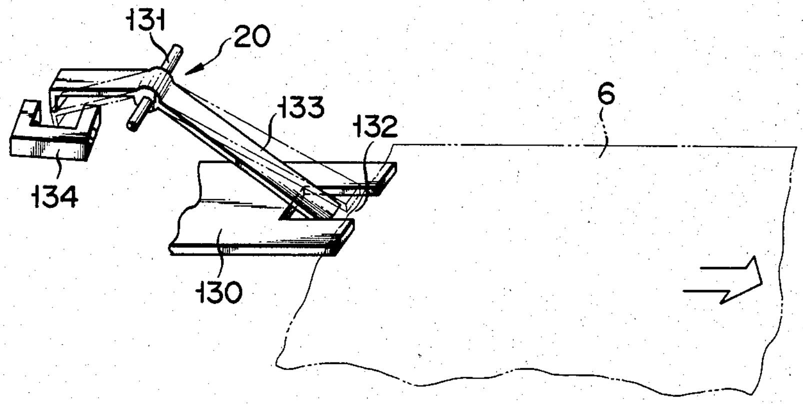

As shown in FIG. 17, the ribbon sag/cut detector 20 includes a ribbon guide 130 provided along the underside of the travel path of the thermal transfer ribbon 6, a detection lever 133 rockably supported by a support shaft 131 over the ribbon guide 130 and urged by its own weight so that one end thereof gets into an indentation formed in the ribbon guide 130, and a photo interrupter switch 134 for detecting the movement of the other end of the detection lever 133. If the thermal transfer ribbon 6 is slackened or cut, the detection lever 133 is shifted from the position indicated by the two-dot and dashed line to the position indicated by the solid line. This displacement is detected by the switch 134, and thus the sag or cut of the thermal transfer ribbon 6 is detected.

Figure 18:
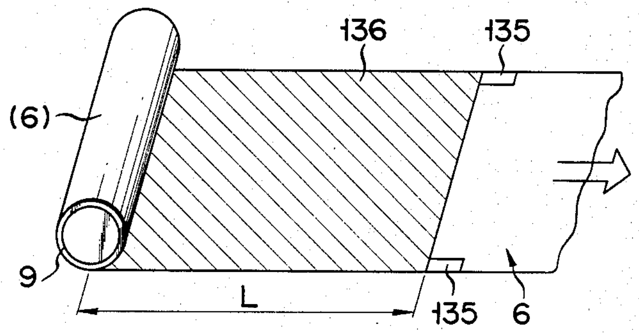

As shown in FIG. 18, the thermal transfer ribbon 6 has an extra portion 136 (hatched portion) following the region where a pair of end marks 135 are put. The extra portion 136 has a length L which permits recording for the next page (L>maximum length for one page−distance between the detector 19 and thermal head 5). Thus, printing can be continued even after the end marks 135 are detected by the ribbon end detector 19. By doing this, recording for one page can be accomplished without interrupting the recording on the transfer sheet P.

Figure 19:
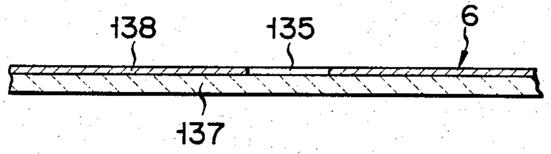

As shown in FIG. 19, the thermal transfer ribbon 6 is formed of a polyester film 137 and an ink layer 138 of polyethylene wax formed on one surface of the film 137. The end marks 135 are formed by removing part of the ink layer 138.

The present invention is not limited to the arrangement of the one embodiment described above. In the above embodiment, the setting of the upper unit 35 on the lower unit 36 is detected in response to the signal from the upper unit lock detector 31 which has a switch associated with the power switch 30. Alternatively, however, the setting of the upper unit 35 may be detected by detecting the locking of the hook 45 by the lock mechanism 44.

It is to be understood that various changes and modifications may be effected in the present invention by one skilled in the art without departing from the scope or spirit of the invention.

What is claimed is:

1. A thermal transfer recording apparatus in which ink on a thermal transfer medium is transferred to an objective material for transfer so that information is recorded on the objective material, and which comprises:

a first unit and a second unit swingably attached thereto, said first unit containing therein holding means holding the thermal transfer medium and take-up means driven by a drive source to wind the thermal transfer medium from the holding means, regulating means for regulating the driving timing of the drive source; and detecting means for detecting that the second unit is set on the first unit and outputting a detection signal, wherein said regulating means, receiving the detection signal from the detecting means, causes the drive source to actuate the take-up means, whereby the thermal transfer medium is wound for a predetermined length.

2. The thermal transfer recording apparatus according to claim 1, further comprising a power switch adapted to be turned on when the second unit is set on the first unit and to be turned off when the second unit is separated from the first unit.

3. The thermal transfer recording apparatus according to claim 2, wherein said detecting means outputs the detection signal when the power switch is turned on.

4. The thermal transfer recording apparatus according to claim 3, wherein said power switch has an actuator, and said second unit has a push piece adapted to press the actuator to turn on the power switch when the second unit is set on the first unit.

5. The thermal transfer recording apparatus according to claim 4, further comprising a case covering the power switch and having a slit through which the push piece can pass when the second unit is set on the first unit.

6. The thermal transfer recording apparatus according to claim 1, wherein said holding means includes back tension means adapted to apply back tension to the thermal transfer medium while the thermal transfer medium is being wound.

* * * * *